United States Patent [19]

Garner et al.

[11] Patent Number: 4,696,977
[45] Date of Patent: Sep. 29, 1987

[54] PROCESS FOR PREPARING NYLON BLOCK COPOLYMERS

[75] Inventors: Albert Y. Garner, Springfield; James D. Gabbert, Wilbraham, both of Mass.; Ross M. Hedrick, St. Louis, Mo.

[73] Assignee: DSM Rim Nylon V.O.F., Geleen, Netherlands

[21] Appl. No.: 775,544

[22] Filed: Sep. 12, 1985

Related U.S. Application Data

[60] Division of Ser. No. 658,958, Oct. 9, 1984, Pat. No. 4,587,305, which is a continuation-in-part of Ser. No. 560,644, Dec. 12, 1983, abandoned.

[51] Int. Cl.$^4$ .................. C08L 23/26; C08L 67/02; C08L 71/02
[52] U.S. Cl. ................... 525/184; 525/408; 525/437; 525/474; 528/318; 528/319; 528/326
[58] Field of Search ............. 525/184, 408, 437, 474; 528/318, 319, 326

[56] References Cited

U.S. PATENT DOCUMENTS

| | | | |
|---|---|---|---|
| 2,727,018 | 12/1955 | Evans et al. | 525/533 |
| 3,498,956 | 3/1970 | Birkner | 528/318 |
| 4,107,154 | 8/1978 | Bacskai | 528/318 |
| 4,346,200 | 8/1982 | Woodbrey | 525/408 |
| 4,501,821 | 2/1985 | Hodek et al. | 528/319 |

*Primary Examiner*—Wilbert J. Briggs, Sr.
*Attorney, Agent, or Firm*—Cushman, Darby & Cushman

[57] ABSTRACT

A process for preparing a nylon-6 block copolymer in which a solution comprising an acyllactam, epsilon-caprolactam and magnesium chloride is brought into reactive admixture with a solution of magnesium dilactam in epsilon-caprolactam. The acyllactam magnesium chloride solution is prepared by reaction of an acid halide functional material and magnesium dilactam.

35 Claims, No Drawings

PROCESS FOR PREPARING NYLON BLOCK COPOLYMERS

CROSS REFERENCE TO RELATED APPLICATION

This is a division of application Ser. No. 658,958, filed Oct. 9, 1984, now U.S. Pat. No. 4,587,305, which is a continuation-in-part of copending application Ser. No. 560,644, filed Dec. 12, 1983, now abandoned.

The present invention relates to a process of preparing nylon block copolymers and to a composition useful for preparing such block copolymers.

Generally, nylon block copolymers may be comprised of alternating blocks of polyamide segments and other segments, such as elastomeric segments of polymer residues such as polyethers, polyesters, hydrocarbons or polysiloxanes. These nylon block copolymers can either be linear or branched depending upon the structure of the elastomeric segment from which the block polymer is prepared. A more detailed discussion of the structure and a method of preparing a particular type of nylon block copolymer can be found in U.S. Pat. No. 4,031,164 issued to Hedrick and Gabbert which is incorporated herein by reference.

U.S. Pat. No. Re 30,371, teaches the reaction between bisimide and polyol in the presence of catalyst to form acyl lactam functionalized materials. These acyl lactam functionalized materials may be subsequently reacted with additional lactam monomer in the presence of a catalyst to prepare nylon block copolymers. It may be desirable to neutralize the catalyst after preparation of the functionalized materials prior to the addition of lactam monomer to avoid difficulties in controlling the initiation of lactam polymerization during the preparation of nylon block copolymers.

U.S. application Ser. Nos. 467,625 and 467,703, which are copending with and assigned to the same assignee of the instant application, teach acyl lactam functionalized materials which are prepared by the reaction between acid halides and lactam monomer. These acyllactam materials may be concurrently or subsequently reacted with additional lactam monomer in the presence of a catalyst to form nylon block copolymers. As taught in these applications, the method of preparing acyl lactam functional materials involves reacting acid halide functional material with lactam monomer in the presence of an acid scavenger. The acid scavenger reacts with the acid generated to form a salt which precipitates out of solution and is removed by filtration.

It has also heretofore been known from British Pat. No. 1,067,153, that acid halide functionalized materials can be reacted with lactam monomer in the presence of catalyst to form acyllactam initiators in situ and initiate the formation of nylon block copolymers and from U.S. Pat. No. 3,451,963 that in the polymerization of caprolactam to form nylon-6, N-halometallic lactam catalyst can be prepared in situ by the reaction between metal lactam and a metal halide.

The present invention provides a method of preparing a nylon-6 block polymer which comprises reacting an acid halide functionalized material with a solution of magnesium dilactam in epsilon-caprolactam to form a storage stable solution of acyllactam functionalized material containing magnesium halide and subsequently adding more magnesium dilactam solution and epsilon caprolactam to form a reaction mixture in which epsilon caprolactam is rapidly polymerized to nylon-6 blocks by addition to the acyllactam functionalized material. The reaction mixture can be used in casting blocks of nylon-6 copolymer and in reaction injection molding of such copolymers. The method therefor avoids a separate intermediate preparation of acyllactam functionalized material by reaction of acid halide functionalized material with a lactam in the presence of an acid acceptor, involving the precipitation of the acid acceptor salt and a tedious filtration step to remove the salt. The method further provides the advantage of a much more stable initiator species than the acid halide functionalized material per se. Another aspect of the invention is directed to the storage-stable composition of acyllactam functionalized material and magnesium halide which provides the initiator for polymerization of caprolactam and which reacts with magnesium dilactam to form a halomagnesium lactam catalyst for fast polymerization of the caprolactam. The amount of acid halide functionalized material and magnesium dilactam used to prepare the composition is such that there is present $2\pm0.2$ equivalents of acid halide per mole of magnesium dilactam. When the acid halide amount is appreciably more than 2 equivalents, the excess may cause some instability of the alcyllactam functionalized material. When it is appreciably less than two equivalents, some halomagnesium lactam is formed and can cause premature polymerization of the epsilon-caprolactam present in the acyllactam solution prior to the addition of magnesium dilactam at the desired polymerization step. It is therefore preferable in forming the acyllactam magnesium halide solution to adjust the amount of acid halide functional material to provide 2 equivalents per mole of magnesium dilactam.

Nylon block copolymers of the type with which the present invention is concerned are generally comprised of alternating blocks of polyamide segments (—NH—Y—CO—)$_m$, wherein Y is pentamethylene and m is an integer greater than one, and elastomer segments of polymer residues such as residues of polyethers, hydrocarbons, polyesters or polysiloxanes or combinations thereof.

For the purposes of the present invention the term "acid halide functional material" means an oligomer or polymer containing at least one acid halide group per molecule. The halide is replaced by a N-lactam group represented by the formula

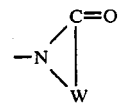

where W is a C$_3$ to C$_{12}$ alkylene or substituted alkylene radical, upon reaction with a magnesium dilactam represented by the formula

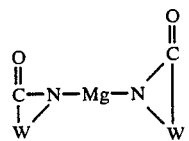

to provide the acyllactam functional material which acts as the initiator species for polymerization of epsilon-caprolactam to yield the nylon-6 block copolymer.

The term "acid halide group" means for the purposes of the present invention the halide derivative of a carboxylic acid, a sulfonic acid, a phospho-acid, or other equivalent acid. The preferred acid halide group is derived from a carboxylic acid group, with chlorine being the preferred halogen substituent. Preferably, the acid halide functional material possesses at least two acid halide groups, and more preferably at least three acid halide groups. The term "acid halide functionality" means the number of acid halide groups possessed by one molecule of the above defined "acid halide functional material". The backbone of the oligomers or polymers useful for the practice of the present invention are those which will provide elastomeric segments in a nylon block copolymer when it is incorporated therein. Suitable oligomer or polymer backbones are of molecular weight in the range of about 200 to about 15,000 and are selected from the group consisting of polyalkylene ethers, hydrocarbons such as polyalkenes, polyalkadienes, and alkadiene copolymers, polyesters containing polyalkylene, polyalkadiene, alkadiene copolymer or polyalkylene ether segments, and polysiloxanes. When such segments are incorporated into nylon block copolymers, in an amount of at least 50 weight percent, they characteristically impart to the copolymers a tensile recovery of at least about 50 percent. Tensile recovery is determined on a dry, as molded, sample of polymer elongated 50% of its initial length (l) and held for 10 minutes before release of tension. Ten minutes after release the length of the sample ($l_r$) is remeasured. The percentage recovery is $1.5 \text{ l-}l_r \times 100./0.5 \text{ l}$ While it is required that the nylon block copolymer be comprised of at least 50 weight percent of the elastomeric portion in order to determine whether or not it would behave as an elastomeric segment as defined above, it should be appreciated that the amount of elastomeric segment in the nylon block copolymers prepared by the process of the present invention, is not limited to at least 50 weight percent since lower and higher amounts in the range of 10 to 90 weight percent also impart improved properties to the nylon polymer.

One preferred acid halide functional material used in the process of the present invention has the following general structure:

$$Z-[O-A+X]_b]_n$$

wherein the Z segment is a polyether, a polyester containing polyether or hydrocarbon segments, a hydrocarbon, a polysiloxane, or combinations thereof; wherein A is a moiety selected from the group consisting of

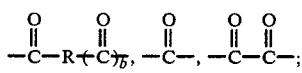

—SO$_2$— and —POR$_1$—; wherein:
b is an integer equal to 1, 2 or 3;
R is a polyfunctional radical derived from an acyclic or cyclic hydrocarbon or ether compound of a molecular weight of about 300 or less preferably a cyclic hydrocarbon and more preferably benzene;
R$_1$ is selected from the group consisting of alkyl, aryl, aralkyl, alkyloxy, aryloxy, aralkyloxy, and halogen groups;
n is an integer equal to one or more, more preferably, at least 2 and, still more preferably, at least 3; and X is halide and preferably chloride.

These preferred acid halide functional materials generally may be prepared by the reaction of 1 equivalent of hydroxy functionalized oligomers and polymers, such as hydroxy functionalized polyethers, hydrocarbons, polyesters containing polyether segments, polyesters containing hydrocarbon segments or polysiloxanes, with 2 equivalents of polyfunctional acid halides, preferably polyfunctional aromatic halides such as isophthaloyl and terephthaloyl chloride, in the presence of an acid scavenger such as an amine. Preferably the A group is

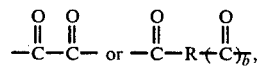

wherein R and b are as defined above and is more preferably

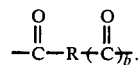

The acid halide functional materials are derived from oligomers or polymers of molecular weights from about 200 to about 15,000, more preferably from about 1000 to about 10,000. Preferred acid halide functional materials are those derived from polyether diols and polyols having molecular weights greater than about 1000 and, preferably, between about 2000 and about 8000. Other preferred functional materials are those derived from hydrocarbon diols and polyols having molecular weights of at least about 1000, and preferably, about 2000 to about 5000. Still other preferred functional materials contain polyester-ether backbones or polyester-hydrocarbon backbones and are prepared by reacting 1 equivalent of polyether diols or polyols or hydrocarbon diols or polyols of molecular weights of at least about 1000 with less than 2 equivalents of di- or tri-functional acid halides so that a limited degree of chain extension of the diols or polyols through the formation of ester groups is obtained. All references herein to molecular weight shall mean number average molecular weight which is determined by methods well known in the art.

Suitable polyether backbones for the acid halide functional material and the acyllactam derived therefrom are the various polyalkyleneoxides such as polyethyleneoxides polypropyleneoxides and poly(tetramethyleneoxides). Examples of suitable polymeric hydrocarbons are the various polyalkenes and polyalkadienes and alkaldiene copolymers such as polyethylene, polypropylene, and polybutadiene and copolymers of butadiene and acrylonitrile. Examples of suitable polyesters are those prepared by reacting polyether polyols such as polyoxypropylene polyol or polyoxyethylene polyol with polyfunctional acid halides such as terephthaloyl chloride so as to form a polyesterether or reacting a polymeric hydrocarbon polyol such as polybutadiene diol with a polyfunctional acid halide such as terephthaloyl chloride so as to form a polyesterhydrocarbon. Examples of suitable polysiloxanes are silicon polycarbinol and polydimethylsiloxane diols and polyols.

An example of a nylon-6 block copolymer prepared from the above described preferred acid halide functional material would have the following general structure:

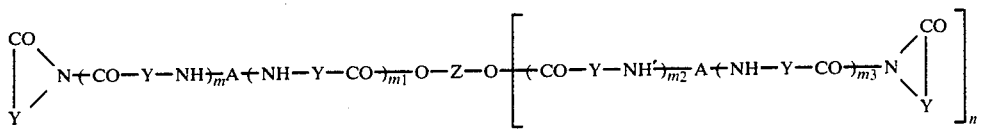

wherein:

Y, Z, A and n are as defined above; and m, $m_1$, $m_2$, and $m_3$ are integers equal to one or more.

The magnesium dilactams useful for the practice of the present invention can be prepared from any suitable lactam, such as, epsilon-caprolactam, 2-pyrrolidone, lauryl-lactam, or caprolactams other than epsilon-caprolactam. Preferred magnesium dilactams are magnesium di-2-pyrrolidone and magnesium di(epsilon-caprolactam).

One method of preparing magnesium dilactam is by reacting the desired lactam monomer with an alkyloxide of magnesium and removing the alkanol produced in the reaction by distilling it from the reaction mixture. However, as known to those skilled in the art, there are other conceivable means of preparing magnesium dilactams and the present invention should not be limited to the above discussed procedure. For convenience in handling the magnesium dilactam, it is preferably dissolved in epsilon-caprolactam for later use in polymerization of epsilon-caprolactam. The magnesium dilactam is readily reacted with the acid halide functional material in any suitable manner. For example it may be added to a solution of acid halide functional material dissolved in a suitable inert solvent such as tetrahydrofuran and stirred vigorously to allow reaction to occur. The solvent can then be stripped to provide the acyllactam magnesium halide composition. When epsilon-caprolactam is used as the solvent for the magnesium dilactam, the product will also contain epsilon-caprolactam and more epsilon-caprolactam may be added to provide a solution melt of adequate viscosity for handling and pumping. This solution is the first solution of the process of the present invention. Since the acyllactam is an initiator of polymerization of epsilon-caprolactam, it is essential that substantially all of the magnesium dilactam added to the acid halide functional material to convert it to acyllactam should be converted to inactive magnesium halide. This is accomplished by using $2\pm 0.2$ equivalents of acid halide functionality for each mole of magnesium dilactam in preparing the composition. Preferably 2 equivalents of acid halide functionality is provided for each mole of magnesium dilactam. Thus the potential for forming in the first solution halomagnesium lactam, an active catalyst for the polymerization of epsilon caprolactam in the presence of initiator is diminished and premature polymerization is avoided.

The second solution used in the process of the present invention is a solution of magnesium dilactam in epsilon-caprolactam. When the first and second solutions are brought into reactive contact at a suitable reaction temperature, it is believed that the magnesium dilactam of the second solution reacts with the magnesium dihalide present in the first solution to form lactam magnesium halide in situ to provide a highly effective lactam polymerization catalyst. The amount of additional magnesium dilactam to be used should be an amount in excess of deactivating impurities and sufficient to polymerize the epsilon-caprolactam. This amount will vary depending upon the concentration of impurities and upon the polymerization speed deemed desirable in the particular application. The preferred amount of additional magnesium dilactam generally ranges from about 0.5 moles to about 1 mole per equivalent of acid halide functionality of the acid halide functional material used to prepare the acyllactam magnesium chloride solution.

The admixture of the first and second solutions in the process of the present invention, and the introduction of the admixture into a mold may be carried out by various procedures. Typically, in casting and reaction injection molding where fast reaction is desired, the first and second solutions of the process will be rapidly and intensely mixed and the admixture immediately introduced into the mold. Any mold temperature at which the polymerization reaction occurs can be selected, generally between about 80° C. and about 250° C., and preferably between about 100° C. and about 160° C. However, it should be noted that various means for mixing together these materials to prepare nylon block copolymers are suitable and the present invention is not intended to be limited to any particular method.

The following examples will demonstrate the preparation of the composition of the present invention and the process of preparing nylon block copolymers. Parts and percentages are by weight unless indicated otherwise.

EXAMPLE 1

Preparation of Magnesium Di-pyrrolidone in Caprolactam

To a 1-liter 4-neck flask, equipped with a stirrer, distillation head, thermometer and stopper and placed in an oil bath, 12 grams (gms) magnesium, 200 milliliters (mls) ethanol, 100 milliliters (mls) heptane were added. The solution was brought to reflux by raising the temperature of the bath to about 81° C. while placing the flask under a nitrogen atmosphere. The temperature of the solution was approximately 72° C. To this refluxing solution 80 mls of 2-pyrrolidone were added while the solution was stirred. For approximately 10 minutes after the addition of the 2-pyrrolidone, the ethanol and heptane were distilled off at atmospheric pressure. Next, 140 gms of molten caprolactam were added with the bath temperature being raised to about 120° C. and the flask being placed under vacuum. The pressure was then slowly lowered to 7 millimeters (mm) Hg so as to remove more ethanol and heptane which was caught in a Dry ice-acetone trap. To the flask 284 gms of molten-dried caprolactam were added while maintaining the pressure at 7 mm Hg. The oil bath was slowly raised to a temperature of about 140° C. and the pressure was lowered to 2 mm Hg. After the removal of 171.4 gms of material, the hot solution was cooled to 85° C. at which time it was transferred to a double-walled plastic bag and allowed to cool down and solidify on Dry ice. After solidification, the resulting solidified solution was broken up into fine particles. The yield was 500.6 gms of material which contained 0.5 mole magnesium-di-2-pyrrolidone in caprolactam.

EXAMPLE 2

Preparation of Acid Chloride Functional Material

An acid halide functionalized material was prepared by reacting a polyether functionalized with three hydroxyl groups with a di-functional acid halide. The resulting functionalized material is a preferred acid halide functional material as described above.

To a 2-liter flask 67 mls of triethylamine and 80 mls of tetrahydrofuran were added to 801 gms of an ethylene oxide capped poly(oxypropylene)triol (approximate molecular weight of 4,800), 81.4 gms terephthaloyl chloride and 400 gms of tetrahydrofuran over approximately 10 minutes. The mole ratio of triol to diacid chloride was 2:5. This mixture was maintained at room temperature for 3 hours under a nitrogen atmosphere. The resulting mixture was then filtered, leaving a slightly yellow filtrate. A small sample was stripped of the remaining tetrahydrofuran using a rotary evaporator with the water bath at 60°–70° C. so as to calculate the yield of acid halide functional material recovered. The yield was 759.1 gms of acid chloride functional material in tetrahydrofuran.

EXAMPLE 3

Preparation of Acyllactam, Magnesium Chloride Solution

An acyllactam solution in accordance with the present invention was prepared by reacting 2 equivalents of the acid chloride functional material of Example 2 with one mole of magnesium di-pyrrolidone supplied by the composition of Example 1.

In a flask containing 1143.1 gms of the tetrahydrofuran solution of the acid halide functional material of Example 2, 134 gms of the solution of magnesium di-pyrrolidone in caprolactam prepared in Example 1 were added. The resulting mixture was stirred vigorously at room temperature and then stripped in a rotary evaporator heated by a water bath at 60°–70° C. The yield after stripping was 861.0 gms of the composition (an example of a first solution of the process of the present invention).

EXAMPLES 4–6

Preparation of Nylon-6 Block Copolymer

The composition prepared in Example 3 was used in the following three Examples 4–6 to show the preparation of nylon block copolymer with the magnesium di-pyrrolidone prepared in Example 1. Three test tubes were each charged with 5.7 gms of the material prepared in Example 3 and 20 gms of distilled caprolactam. Each tube was placed into an oil bath maintained at a temperature of 130° C. Once the temperature of the materials in each tube were equilibrated an amount of the magnesium di-pyrrolidone caprolactam solution of Example 1 was added to each example and the set time for polymerization was observed. Table I below lists the amount of magnesium di-pyrrolidone caprolactam (MGPC) solution added to each Example and the polymerization time.

TABLE 1

| Example | MGPC solution(gm) | Polymerization Time(sec) |
|---|---|---|
| 4 | 1.7 | 15–20 |
| 5 | 0.8 | 30 |
| 6 | 0.4 | No reaction after 10 minutes |

EXAMPLE 7

In this example, 95 gms of a composition as prepared above in Example 3 were charged together with 132 gms caprolactam and 3 mls of a 4% aqueous cupric acetate solution into a 500 ml 4-neck flask equipped with a stirrer, nitrogen inlet, thermocouple, heating mantle and vacuum distillation head. The mixture was stirred and heated to about 130° C. while under vacuum. After 25 mls of material were removed by vacuum distillation, the mixture was cooled down to and held at 100° C. under vacuum for use.

A second flask was charged with 26 gms of a 1 molar magnesium di-2-pyrrolidone in caprolactam solution and 174 gms anhydrous caprolactam. After the mixture was degassed, the temperature was raised and held at 100° C. under vacuum for use.

Equal volumes of each of the above prepared solutions were pumped separately by 2-#5 Zenith gear pumps into a ¼×8" Kenics Static Mixer and the admixture was fed into a Teflon-coated mold (8"×8"×⅛") previously heated to 130° C. It was determined from exotherm temperature traces, that polymerization had been completed within 104 seconds after the mold was filled. The material was left in the mold an additional 200 seconds for a total time of about 5 minutes. Test specimens were cut from the resulting casting for the purpose of testing the various mechanical properties substantially in accordance with these procedures:

| | | |
|---|---|---|
| Tensile Strength | ASTM 638 | [units are pounds per square inch (psi) or megapascals (MPa)]. |
| Tear Strength: | ASTM D1004 | [units are pounds-force per linear inch (pli) or newton per meter (N/m)]. |
| Flexural Modulus: | ASTM D638 | [units are pounds per square inch (psi) or megapascals (MPa)]. |
| Tensile Elongation: | ASTM D638 | [units in %] |
| Notched Izod Impact: | ASTM D256 | [units are foot-pounds per inch notch (ft. lbs./in.) or joules per meter (J/m)]. |

The properties for the molded sample of Example 7 are listed below in Table II:

TABLE II

| | |
|---|---|
| TENSILE STRENGTH (PSI) MPa - YIELD (7370) | 50.8 |
| BREAK (6690) | 46.1 |
| ELONGATION % YIELD 8.5 | |
| BREAK 90 | |
| TEAR STRENGTH (PLI) N/m (1608) | 282 |
| FLEXURAL MODULUS (PSI) MPa (220,000) | 1517 |
| NOTCHED IZOD IMPACT (ft. lbs/in.) J/m (5.5) | 293 |

The above examples demonstrated magnesium di-2-pyrrolidone as the magnesium dilactam used to prepare the acyllactam solution (the first solution of the process of the present invention) and the preparation of nylon block copolymer from this solution. It should be understood that other magnesium dilactams, such as magnesium di-(epsilon-caprolactam) could be substituted into the above examples for magnesium di-2-pyrrolidone.

While the preferred embodiments have been described and illustrated various modifications and substitutions may be made thereto without departing from the spirit and scope of the presentation. Accordingly, it is to be understood that the present invention has been described by way of illustration and not limitation.

What is claimed is:

1. A process for preparing a nylon block copolymer comprising:
    bringing into reactive admixture:
    (a) a first solution of an acyllactam and magnesium halide in epsilon-caprolactam formed by reaction of 2±0.2 equivalents of an acid halide functional material with one mole of a magnesium dilactam, said acid halide functional material comprising an oligomer or polymer containing at least one acid halide group per molecule; and
    (b) a second solution of magnesium dilactam and epsilon-caprolactam containing sufficient magnesium dilactam to interact with the magnesium halide of the first solution to form a halomagnesium lactam and polymerize the epsilon-caprolactam monomer whereby a nylon block copolymer is obtained containing 10 to 90 wt. % of elastomeric segments provided by said acid halide functional material.

2. The process of claim 1 wherein the lactams of the magnesium dilactam of the first and second solutions are selected from the group consisting of epsilon-caprolactam, 2-pyrrolidone and lauryl-lactam.

3. The process of claim 1 wherein the magnesium dilactam of the first and second solutions is magnesium di-2-pyrrolidone.

4. The process of claim 1 wherein the acid halide group of the acid halide functional material is derived from a carboxylic acid, a sulfonic acid or a phosphoacid.

5. The process of claim 4 wherein the acid halide group is derived from a carboxylic acid.

6. The process of claim 5 wherein the acid halide is an acid chloride.

7. The process of claim 6 wherein 2 equivalents of acid halide functional material are reacted with one mole of magnesium dilactam to form the first solution.

8. The process of claim 6 wherein the amount of magnesium dilactam added in the second solution ranges from about 0.5 to about 1.0 mole per equivalent of acid halide used in forming the first solution.

9. The process of claim 7 wherein the temperature of reaction is in the range of about 100° C. to about 160° C.

10. A process for preparing a nylon block copolymer comprising:
    bringing into reactive admixture:
    (a) a first solution of an acyllactam and magnesium halide in epsilon-caprolactam formed by reaction of 2±0.2 equivalents of an acid halide functional material and one mole of a magnesium dilactam; wherein the acid halid functional material is represented by the formula $Z[O-A(X)_b]_n$; wherein the Z segment is a polyether, a polyester containing polyether segments or hydrocarbon segments, a hydrocarbon, a polysiloxane, or combinations thereof;
    wherein A is selected from the group consisting of

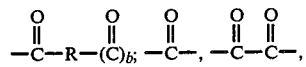

$-SO_2-$ and $-POR_1-$; and wherein b is an integer equal to 1, 2 or 3, $R_1$ is selected from the group consisting of alkyl, aryl, aralkyl, alkyloxy, aryloxy, aralkyloxy and halogen groups, R is a hydrocarbon, or polyether group of molecular weight of about 300 or less, n is an integer equal to one or more, and X is halogen; and
    (b) a second solution of magnesium dilactam in epsilon-caprolactam containing sufficient magnesium dilactam to interact with the magnesium halide of the first solution to form a halomagnesium lactam and polymerize the epsilon-caprolactam monomer whereby a nylon block copolymer containing 10 to 90 wt % of elastomeric segments provided by said acid halide functional material is obtained.

11. The process of claim 10 wherein the lactams of the magnesium dilactams of the first and second solutions are selected from the group consisting of epsilon-caprolactam, 2-pyrrolidone and lauryl-lactam.

12. The process of claim 11 wherein 2 equivalents of acid halide functional material are reacted with one mole of magnesium dilactam to form the first solution.

13. The process of claim 10 wherein the A group is

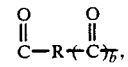

wherein the Z segment is a polyether, a polyester or a hydrocarbon of molecular weight at least about 1000, and wherein X is chlorine.

14. The process of claim 13 wherein the polyether is polyethyleneoxide, polypropyleneoxide, or poly(tetramethyleneoxide) and the hydrocarbon is polybutadiene or polybutadiene-co-acrylonitrile.

15. The process of claim 13 wherein the lactams of the magnesium dilactam of the first and second solutions are selected from the group consisting of epsilon-caprolactam, 2-pyrrolidone and lauryl-lactam.

16. The process of claim 13 wherein 2 equivalents of acid halide functional material are reacted with one mole of magnesium dilactam to form the first solution.

17. The process of claim 13 wherein the amount of magnesium dilactam added in the second solution ranges from about 0.5 to about 1.0 mole per equivalent of acid halide used in forming the first solution.

18. The process of claim 13 wherein the temperature of reaction is in the range of about 100° C. to about 160° C.

19. The process of claim 13 wherein the weight ratio of acylactam to epsilon-caprolactam in the reaction admixture is in the range of 1:9 to 9:1.

20. A two solution system for providing, on mixing the two solutions of the system, a nylon block copolymer, which two solution system comprises:
    in a first solution, epsilon-caprolactam and an acyllactam and magnesium halide, and
    in a second solution magnesium dilactam and epsilon-caprolactam;
    wherein the acyllactam and magnesium halide of the first solution are formed by reaction of 2±0.2 equivalents of an acid halide functional material with one mole of a magnesium dilactam, wherein the acid halide functional material is an oligomer or polymer containing at least one acid group per molecule and wherein the concentration of magnesium dilactam in the second solution is sufficient to interact with the magnesium halide of the first solution to form on mixing of the first and second solutions a halomagnesium lactam and polymerize the epsilon-caprolactam monomer whereby a nylon block copolymer containing 10 to 90 wt % of elastomeric segments provided by said acid halide functional material is obtained.

21. The two solution system of claim 20 wherein the lactams of the acyllactam of the first solution and of the magnesium dilactam of the second solution are independently selected from the group consisting of epsilon-caprolactam, 2-pyrrolidone and lauryl-lactam.

22. The two solution system of claim 21 wherein the lactams are 2-pyrrolidone.

23. The two solution system of claim 20 wherein the acid halide group of the acid halide functional material is derived from a carboxylic acid, a sulfonic acid or a phospho-acid.

24. The two solution system of claim 20 wherein the acid halide group is derived from a carboxylic acid.

25. The two solution system of claim 20 wherein the acid halide is an acid chloride.

26. The two solution system of claim 20 wherein 2 equivalents of acid halide functional material are reacted with 1 mole of magnesium dilactam to form the first solution.

27. The two solution system of claim 20 wherein the amount of magnesium dilactam added in the second solution ranges from about 0.5 to about 1 mole per equivalent of acid halide used in forming the first solution.

28. A two solution system for providing, on mixing of the two solutions of the system, a nylon block copolymer, which two solution system comprises:
(a) in a first solution, epsilon-caprolactam and an acyllactam and magnesium halide formed by reaction of 2±0.2 equivalents of an acid halide functional material and one mole of a magnesium dilactam; wherein the acid halide functional material is represented by the formula $Z[O-A+X)_b]_n$; wherein the Z segment is a polyether, a polyester containing polyether segments or hydrocarbon segments, a hydrocarbon, a polysiloxane, or combinations thereof, wherein A is selected from the group consisting of

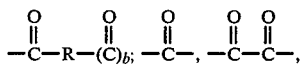

$-SO_2-$ and $-POR_1-$; and wherein b is an integer equal to 1, 2 or 3, $R_1$ is selected from the group consisting of alkyl, aryl, aralkyl, alkyloxy, aryloxy, aralkyloxy and halogen groups, R is a hydrocarbon or polyether group of molecular weight of about 300 or less, n is an integer equal to one or more, and X is halogen; and (b) in a second solution epsilon-caprolactam and sufficient magnesium dilactam to interact with the magnesium halide of the first solution to form a halomagnesium lactam and polymerize the epsilon-caprolactam monomer whereby a nylon block copolymer containing 10–90 wt. % of elastomer segments provided by said acid halide functional material is obtained.

29. The two solution system of claim 28 wherein the lactams of the acyllactam of the first solution and of the magnesium dilactam of the second solution are independently selected from the group consisting of epsilon-caprolactam, 2-pyrrolidone and lauryl-lactam.

30. The two solution system of claim 28 wherein 2 equivalents of acid halide functional material are reacted with 1 mole of magnesium dilactam to form the first solution.

31. The two solution system of claim 28 wherein the A group is

wherein the Z segment is a polyether, a polyester or a hydrocarbon of molecular weight at least about 1000, and wherein X is chlorine.

32. The two solution system of claim 31 wherein the polyether is polyethyleneoxide, polypropyleneoxide, or poly(tetramethyleneoxide) and the hydrocarbon is polybutadiene or polybutadiene-co-acrylonitrile.

33. The two solution system of claim 31 wherein the lactams of the acyllactam of the first solution and of the magnesium dilactam of the second solution are independently selected from the group consisting of epsilon-caprolactam, 2-pyrrolidone and lauryl-lactam.

34. The two solution system of claim 31 wherein 2 equivalents of acid halide functional material are reacted with 1 mole of magnesium dilactam to form the first solution.

35. The two solution system of claim 34 wherein the amount of magnesium dilactam added in the second solution ranges from about 0.5 to about 1 mole per equivalent of acid halide used in forming the first solution.

* * * * *